US006792340B2

(12) United States Patent
Dunsky et al.

(10) Patent No.: US 6,792,340 B2
(45) Date of Patent: Sep. 14, 2004

(54) APPARATUS AND METHOD FOR PROVIDING LIVE DISPLAY OF AIRCRAFT FLIGHT INFORMATION

(76) Inventors: Ronald Dunsky, 125 Prospect Park West, Apt. 6D, Brooklyn, NY (US) 11215; James T. Barry, 35 Allison Dr., Madison, CT (US) 06443

( * ) Notice: Subject to any disclaimer, the term of this patent is extended or adjusted under 35 U.S.C. 154(b) by 0 days.

(21) Appl. No.: 10/136,865

(22) Filed: May 1, 2002

(65) Prior Publication Data

US 2003/0009267 A1 Jan. 9, 2003

Related U.S. Application Data

(60) Provisional application No. 60/287,755, filed on May 1, 2001.

(51) Int. Cl.[7] .................................................. G06F 7/00
(52) U.S. Cl. ........................................... 701/3; 340/945
(58) Field of Search ....................... 701/3, 14; 340/945; 342/387, 450, 456

(56) References Cited

U.S. PATENT DOCUMENTS 5,596,326 A * 1/1997 Fitts ............................ 342/30
5,913,912 A * 6/1999 Nishimura et al. ........... 701/35
6,384,783 B1 * 5/2002 Smith et al. ................ 342/387
2002/0082848 A1 * 6/2002 Hansen et al. ................. 705/1

FOREIGN PATENT DOCUMENTS

JP 408096300 * 4/1996 ............ G08G/5/00

* cited by examiner

*Primary Examiner*—Marthe Y. Marc-Coleman
(74) *Attorney, Agent, or Firm*—Roberts Abokhair & Mardula, LLC

(57) ABSTRACT

A method and apparatus for providing live display of aircraft flight information collects airline flight information from an airline reservation system and obtains aircraft location information based on secondary surveillance radar interrogation using dual frequencies. A central server integrates the airline flight information with the aircraft location information to produce aircraft flight information and provides live display of the aircraft flight information at an airline terminal.

12 Claims, 9 Drawing Sheets

APPARATUS AND METHOD FOR PROVIDING LIVE DISPLAY OF AIRCRAFT FLIGHT INFORMATION

RELATIONSHIP TO PRIOR APPLICATIONS

The present application claims the benefit of Provisional Application No. 60/287,755, filed May 1, 2001 and incorporated herein in its entirety.

BACKGROUND OF THE INVENTION

The present invention is drawn to an apparatus and method for providing live display of aircraft flight information. More particularly, it is drawn to integrating an airport terminal display of flight information with an accurate map display of aircraft location from technology based on secondary surveillance radar interrogation using dual frequencies.

Recently, airline passengers have become disillusioned with the quality of airline information. Events, such as the January 1999 stranding of passengers for 8 hours on a Detroit runway, have highlighted the fact that there is no existing way to convey true operational explanations quickly and directly. Although the city of Detroit's failure to plow side streets was ultimately to blame for the January 1999 incident, airlines are usually blamed for delays, no matter what the true cause may be. An information vacuum breeds speculation—and worse. The state of passenger information in commercial air travel has deteriorated to the point to where the United States Congress has initiated hearings on a Passenger's Bill of Rights.

BRIEF SUMMARY OF THE INVENTION

It is an object of the invention to provide a gate-area information display that communicates live operational flight information to passengers.

It is a further object of the invention to provide a passenger information system with full disclosure about flight delays and the cause of the delays.

It is another object of the invention to provide a passenger information system with accurate and timely updating of information when conditions change.

It is another object of the present passenger information invention to provide a context for passengers to understand factors affecting schedules.

It is yet another object of the present passenger information invention to provide a quick and simple solution to an airline's task of informing passengers, thereby allowing airline personnel to perform their other duties.

It is an object of the present passenger information invention to provide a new tool to airlines to enhance customer and public relations.

It is a further object of the invention to display real-time, accurate, and unfiltered flight information to passengers based on secondary surveillance radar interrogation using dual frequencies.

DETAILED DESCRIPTION OF THE INVENTION

FIGS. 1–4 illustrate a typical embodiment of the flight information display of the present invention. Of course, the present invention is a dynamic product, and is not meant to be limited by the following examples. In the example of FIGS. 1–4, the flight information display screen is based at a gate at Toronto International Airport. Passengers traveling to Vancouver on flight 3987 are presented with this screen. In any of the figures, the passengers can see that the aircraft they will be getting on first has to arrive from Montreal. The dynamic flight track portion on the right side of the screen shows them the present position of their aircraft and what its details (miles from terminal, speed, altitude).

Figure 1:
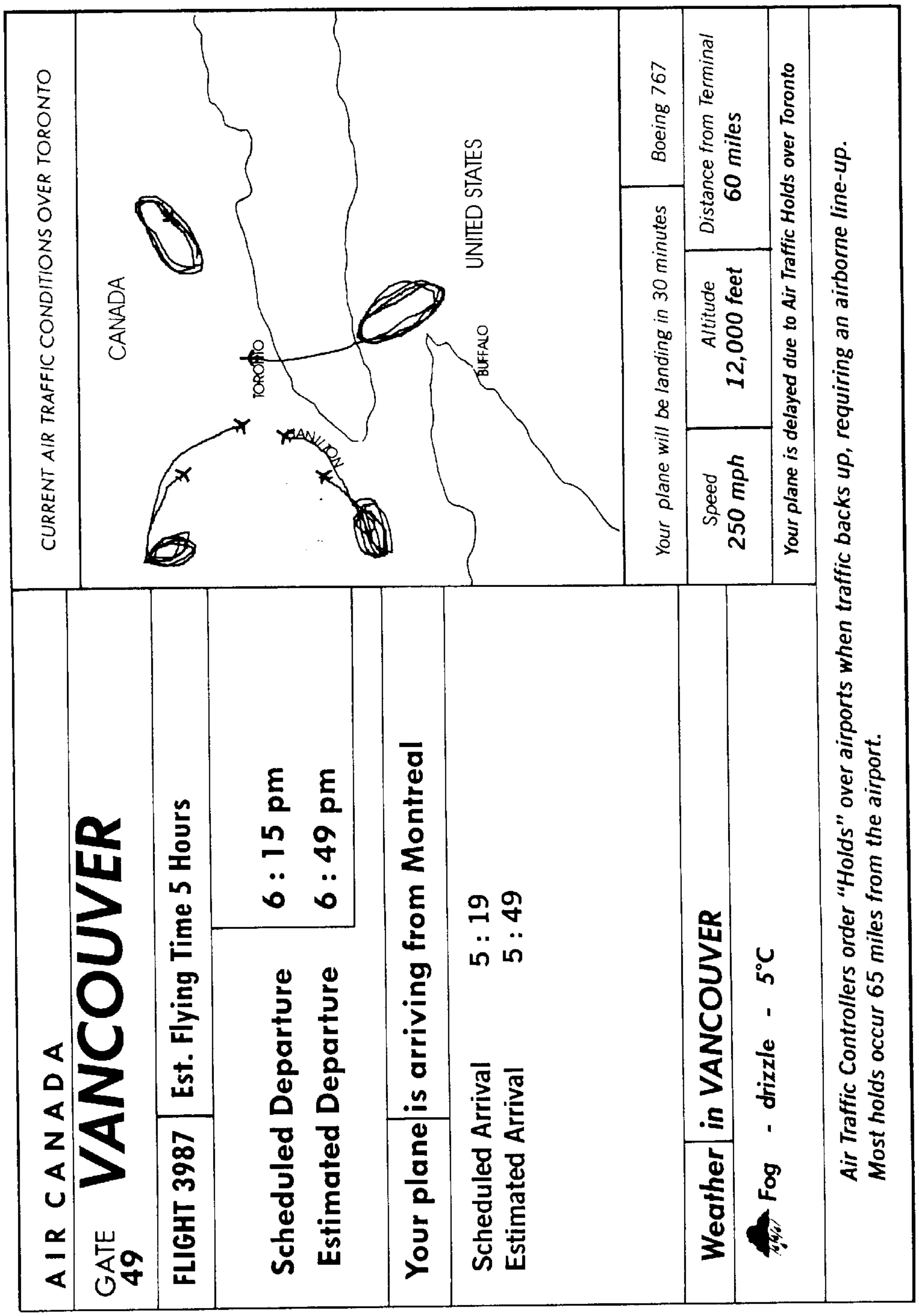
FIGS. 1–4 illustrate an updating of a typical passenger information display of the present invention.

In FIG. 1, it also informs them that the aircraft is in a hold by displaying the red track of the holding pattern and the notice "Your plane is delayed due to Air Traffic Holds over Toronto." The screen also explains what a hold is. In this manner, passengers know the reason for the delay in their expected time of departure. The present invention thereby informs passengers in a graphic, easy-to-understand way, that in the hub-and-spoke system now used by most major airlines, the plane they will be traveling on must first arrive from somewhere else. That prior trip—plus a host of factors affecting that trip that aren't controlled by the airlines, like congestion from other airline traffic, or weather—is what explains the often changing schedule of a departure.

Figure 2:
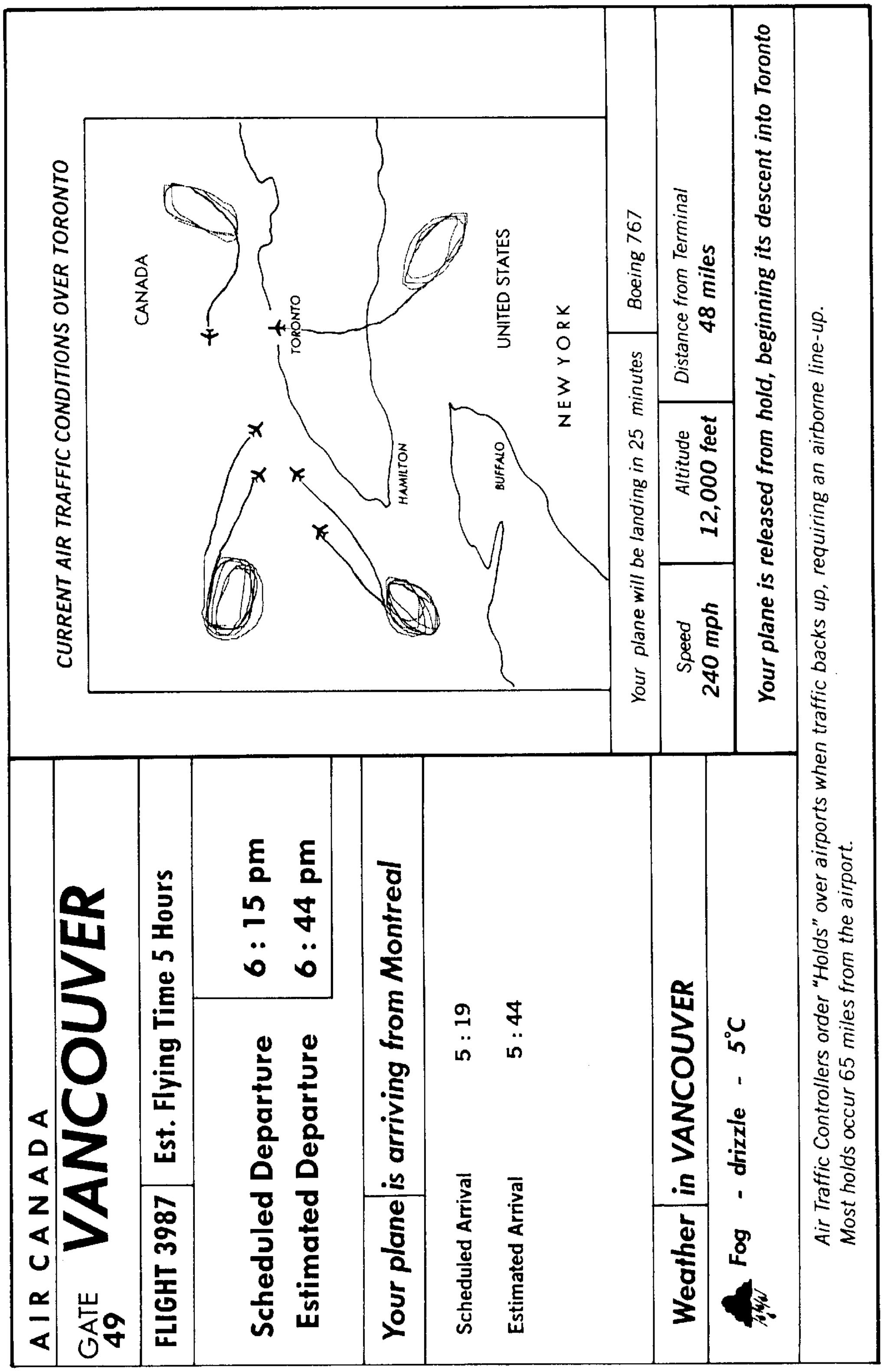
Figure 3:
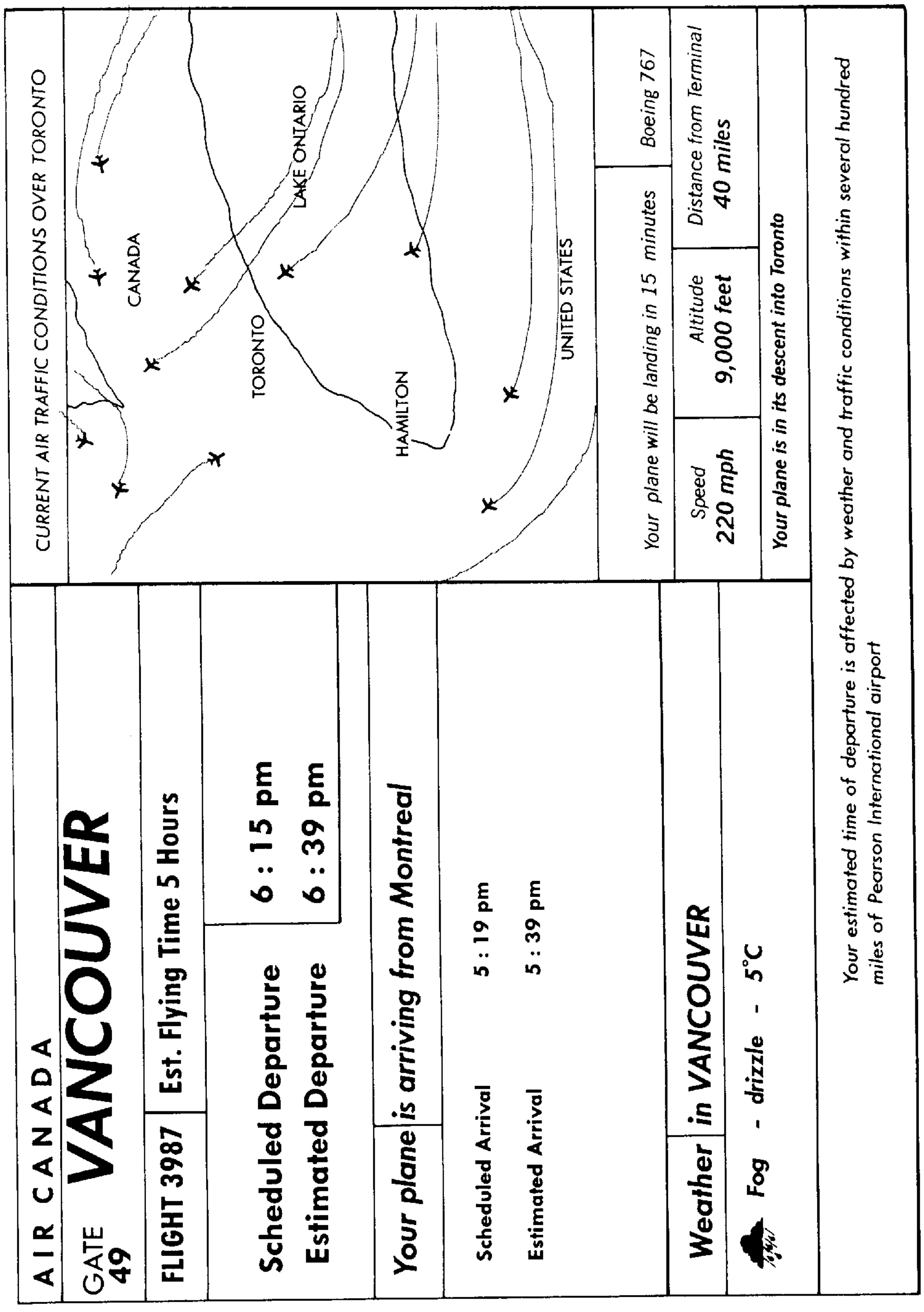
Figure 4:
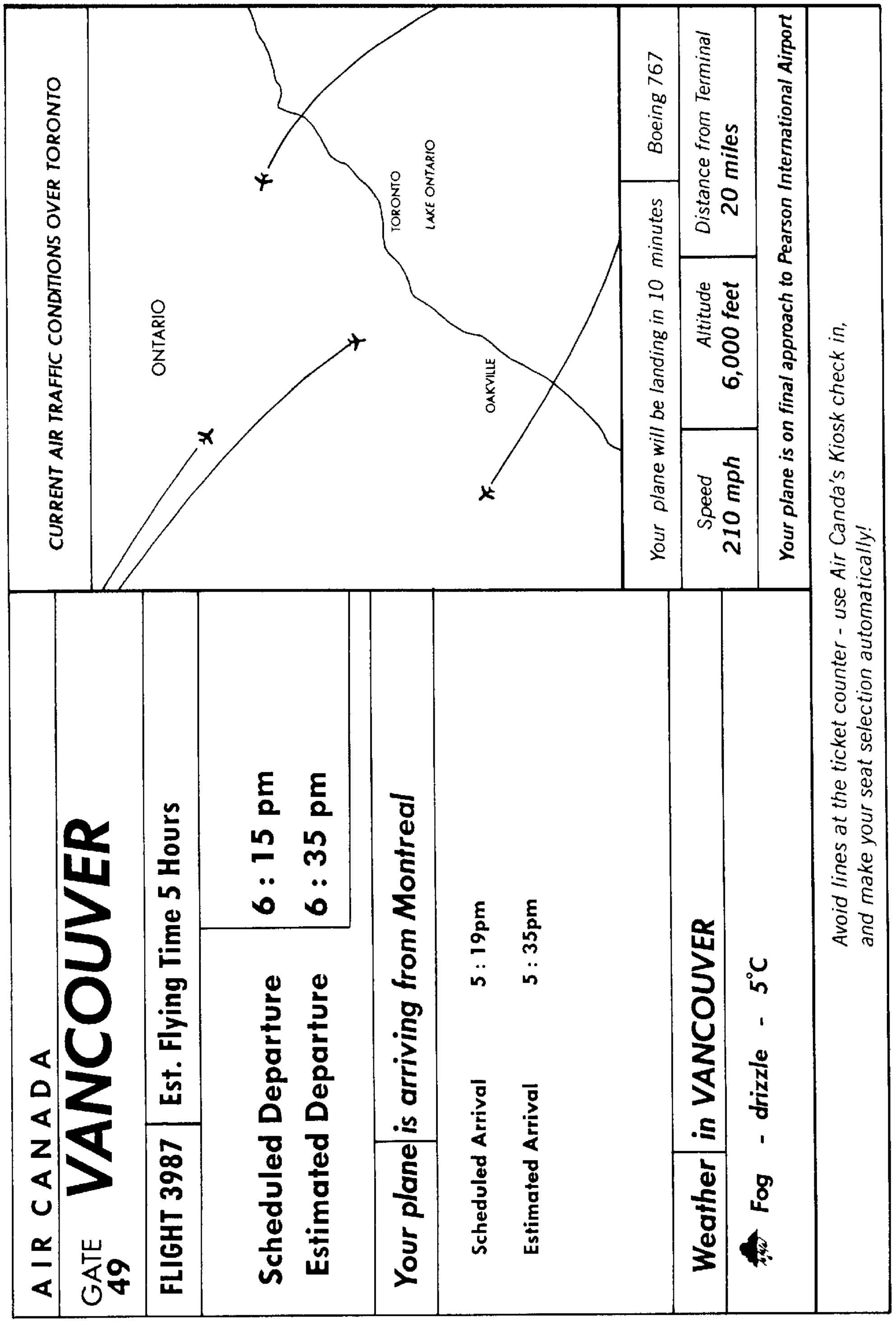

Each subsequent screen display of FIGS. 2–4 shows the changing status of the inbound flight, and how status changes automatically trigger and change a set of messages for the passenger: a new Estimated Time of Arrival for the inbound; a new Estimated Time of Departure for the outbound flight; new speed, altitude, distance from terminal; new messages explaining what the plane is doing and why; new "free-form" (manually inserted) messages at the bottom, customizable by the airline. Note that the flight tracking screen zoomed in closer for each of FIGS. 3 and 4. The display of the present invention can be preprogrammed to provide different zoom levels, and different levels of map detail, depending on what the flight is doing.

Figure 5:
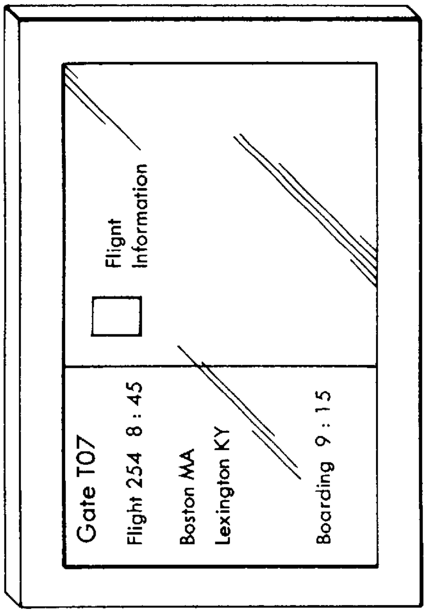
FIG. 5 illustrates a typical airport placement of a large screen display of the present invention.
Figure 6:
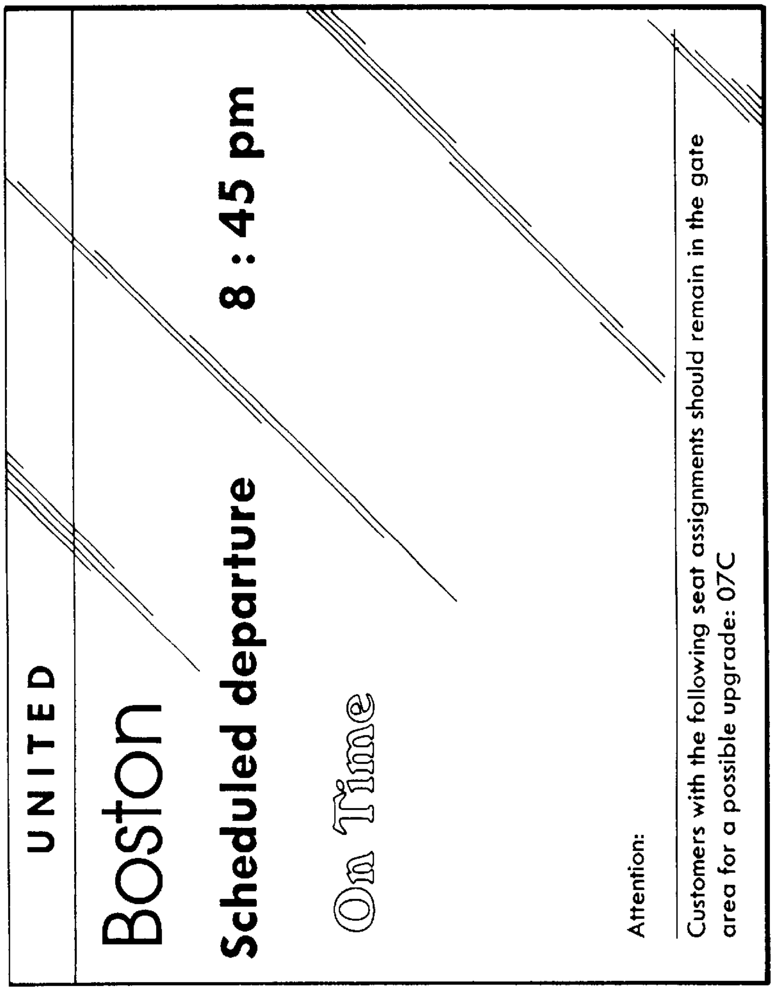
FIG. 6 illustrates an example of additional messaging that can be provided by the display of the present invention.

FIG. 5 illustrates a typical airport gate installation of a large screen dispay of the present invention. The displays in FIGS. 5–6 are different from FIGS. 1–4 and are exemplary of different information that can be displayed by the airlines using the information screen.

Figure 7:
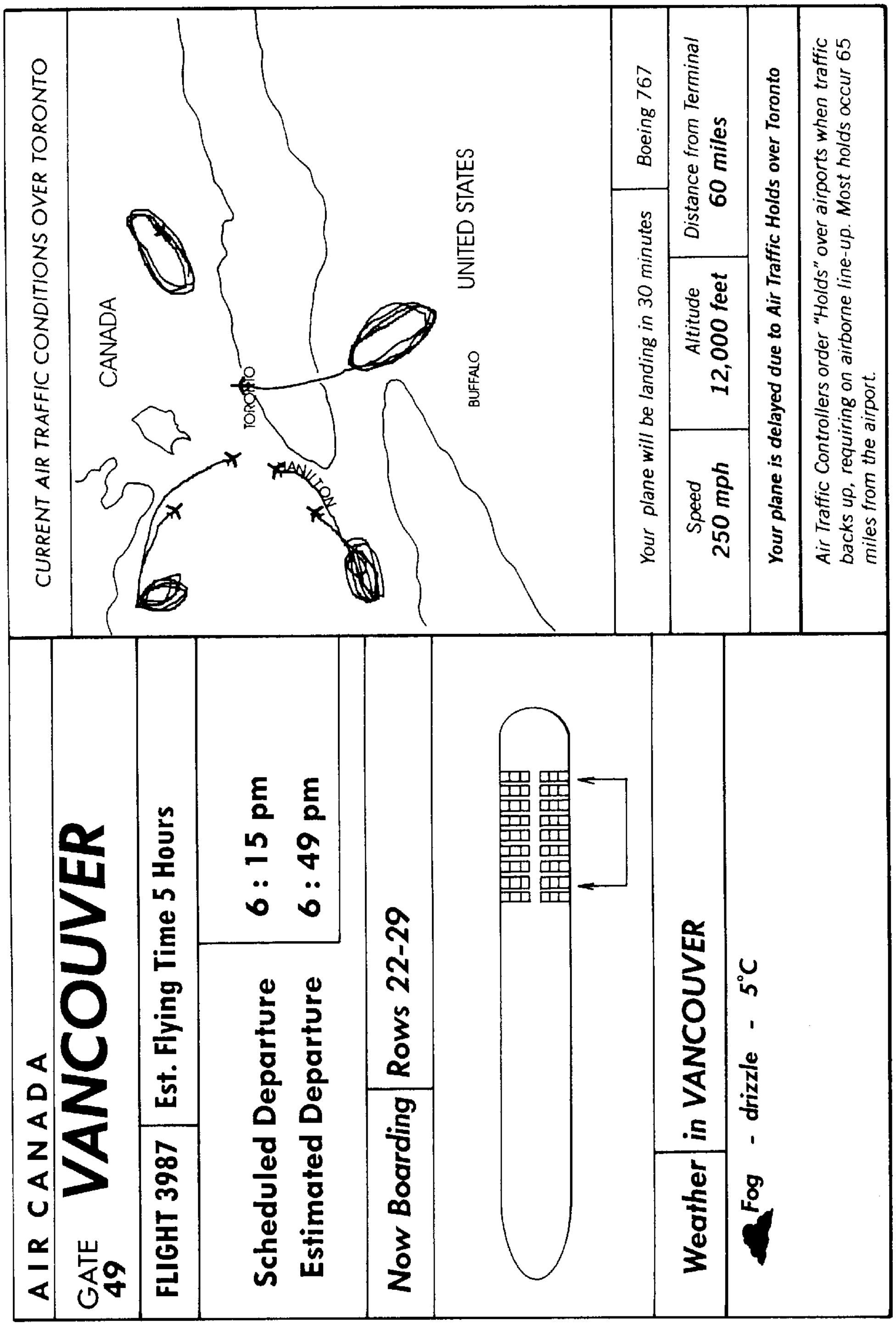
FIGS. 7–8 illustrate example of additional messaging functions that can be incorporated into the flight information display of the present invention.
Figure 8:
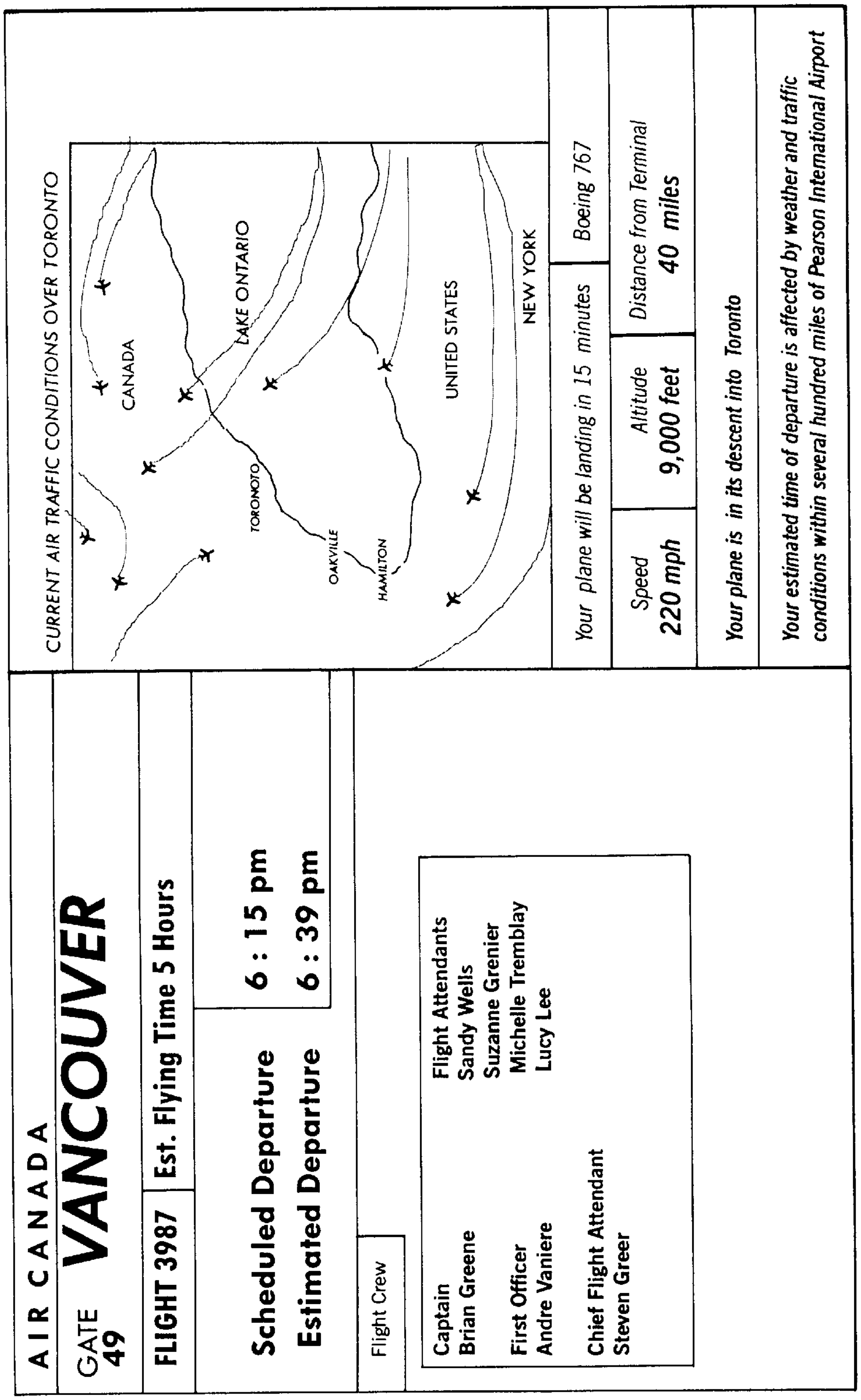

The displays in FIGS. 7–8 are alternate embodiments of the screens of FIGS. 1–4 and are exemplary of additional information that can be added to the flight information screen by the airlines, in this case: boarding procedures, as illustrated in FIG. 7; and crew names, as illustrated in FIG. 8. Airlines will typically use the flight information display screen for multiple messages beyond the flight tracking information, such as destination-city weather, irregular operations text messages, passenger flight benefits, equipment layout/features, boarding process, lists of passengers available for upgrade or standby information, and education on airline procedures.

Figure 9:
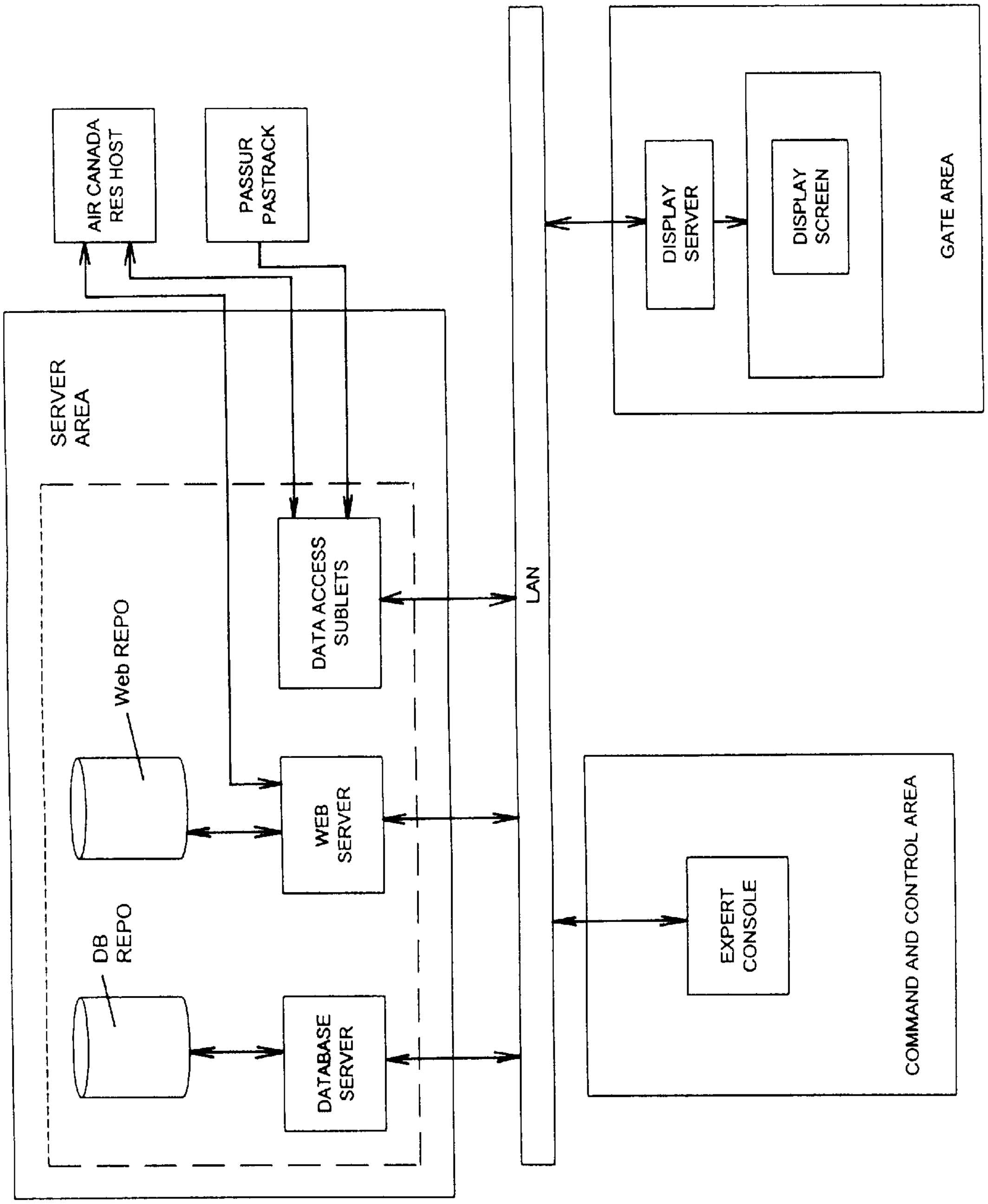
FIG. 9 illustrates a typical topography of the apparatus of the present invention.

FIG. 9 illustrates a schematic diagram of a system architecture that forms the system of the present invention, although other architectures are also possible. The server area collects information from airline reservations and from an aircraft location technology based on secondary surveillance radar interrogation using dual frequencies, as illustrated in FIG. 10, such as PASSUR PASSTRACK software, available from Megadata Inc. of 47 Arch Street, Greenwich, Conn. 06830.

The server provides a browser-based display output over the network (shown as a LAN, although this in not meant as a limitation) to the display server in the gate area for display to passengers. A command and control area is also connected to the network and includes an expert console for performing functions such as inputting operational text messages for display at the gate area.

Figure 10:
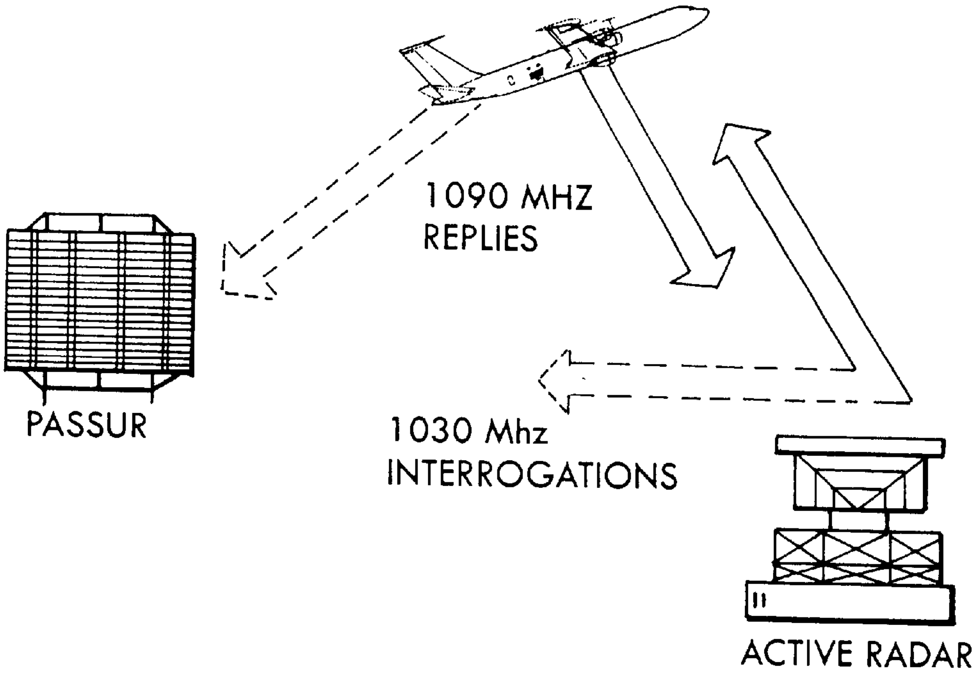
FIG. 10 illustrates the secondary surveillance radar interrogation with dual frequencies used by the present invention

As illustrated in FIG. 10, Passive Secondary Surveillance Radar principles are based on the presence of an actively transmitting airport SSR. The FAA radar (SSR) transmits interrogations through a rotating antenna. As the beam passes a given aircraft, it triggers the transponder, causing the aircraft to transmit on 1090 MHz.

Megadata's PAssive Secondary SUrveillance Radar, or PASSUR, utilizes a dual frequency receiver for the reception of these signals. Radar interrogations at 1030 MHz are received through an integrated antenna. Aircraft replies are received through an electronically controlled directional antenna at 1090 MHz. No radio or radar signals are radiated by the PASSUR. PASSUR provides complete aircraft identification and operations information by utilizing additional sources of flight identification information. Beacon codes from PASSUR flight tracks are integrated with this data to provide aircraft location, airspeed, identifier, type and arrival/departure airport. In some cases more information is provided on the aircraft.

To obtain ETA information and a live visual display of the terminal airspace, with aircraft identifier information, PASTRACK software from Megadata is coupled to the PASSUR hardware. This software interprets the signals from the radar to provide useful information to airlines.

Although described with respect to a particular embodiment, numerous modifications can be made without departing from the scope of the present invention.

What is claimed is:

1. A method for providing live display of aircraft flight information comprising:

collecting airline flight information from an airline reservation system;

obtaining aircraft location information based on secondary surveillance radar interrogation using a dual frequency receiver, comprising:

receiving secondary surveillance radar interrogations at a first frequency at first ground antenna; and receiving aircraft replies at a second frequency at an electronically controlled directional ground antenna;

integrating the airline flight information with the aircraft location information to obtain aircraft flight information; and providing live display of the aircraft flight information at an airline terminal.

2. An apparatus for providing live display of aircraft flight information comprising:

means for collecting airline flight information from an airline reservation system;

means for obtaining aircraft location information based on secondary surveillance radar interrogation using a dual frequency receiver, comprising:

a first ground antenna adapted for receiving secondary surveillance radar interrogations at a first frequency; and an electronically controlled directional ground antenna adapted for receiving aircraft replies at a second frequency;

means for integrating the airline flight information with the aircraft location information to obtain aircraft flight information; and means for providing live display of the aircraft flight information at an airline terminal.

3. The method of claim 1, wherein providing live display of the aircraft flight information further comprises flight track data displayed on a map.

4. The method of claim 3, wherein the flight track data is displayed in different colors to indicate status.

5. The method of claim 4, wherein the flight track data is displayed in red to indicate a holding pattern.

6. The method of claim 3, wherein the flight track data is displayed in different zoom levels.

7. The apparatus of claim 2, wherein said means for providing live display of the aircraft flight information further comprises means for displaying flight track data on a map.

8. The apparatus of claim 7, wherein the means for displaying flight track data uses different colors to indicate status.

9. The apparatus of claim 8, wherein the means for displaying flight track data uses red to indicate a holding pattern.

10. The apparatus of claim 7, wherein the means for displaying flight track data is capable of displaying different zoom levels.

11. The method of claim 1, wherein the first frequency is 1030 MHz and the second frequency is 1090 MHz.

12. The apparatus of claim 2, wherein the first frequency is 1030 MHz and the second frequency is 1090 MHz.

* * * * *